United States Patent
Liu et al.

(10) Patent No.: US 7,653,083 B2
(45) Date of Patent: Jan. 26, 2010

(54) INTERFACE METHOD BETWEEN REMOTE RADIO UNIT AND CENTRALIZED BASE TRANSCEIVER STATION

(75) Inventors: Sheng Liu, Guangdong (CN); Yulin Li, Guangdong (CN)

(73) Assignee: Utstarcom Telecom Co., Ltd., Zhejiang (CN)

( * ) Notice: Subject to any disclaimer, the term of this patent is extended or adjusted under 35 U.S.C. 154(b) by 100 days.

(21) Appl. No.: 11/572,027

(22) PCT Filed: Jul. 13, 2004

(86) PCT No.: PCT/CN2004/000800

§ 371 (c)(1),
(2), (4) Date: Dec. 3, 2007

(87) PCT Pub. No.: WO2006/005228

PCT Pub. Date: Jan. 19, 2006

(65) Prior Publication Data

US 2008/0199183 A1 Aug. 21, 2008

(51) Int. Cl.
*H04J 3/16* (2006.01)
*H04J 1/16* (2006.01)

(52) U.S. Cl. .................. 370/466; 370/464; 370/465; 370/473; 370/476; 370/229; 370/230; 370/232

(58) Field of Classification Search ............... 370/229, 370/230, 232, 310, 328, 329, 331, 351, 357, 370/360, 362, 363, 464, 465, 466, 473, 474, 370/476; 455/73, 550.1, 561

See application file for complete search history.

(56) References Cited

U.S. PATENT DOCUMENTS 5,644,576 A 7/1997 Bauchot et al.

(Continued)

FOREIGN PATENT DOCUMENTS

CN 1281322 A 1/2001

OTHER PUBLICATIONS

American National Standard for Telecommunications, Generic Framing Procedure, IEEE, http://www.ieee802.org/rprsg/public/presentations/may2001/gfp.pdf.*

(Continued)

*Primary Examiner*—Ricky Ngo
*Assistant Examiner*—Paul Masur
(74) *Attorney, Agent, or Firm*—Greenberg Traurig, LLP

(57) ABSTRACT

The present invention discloses a method for transmitting signal between a central channel processing Main Unit (MU) and one or more Remote Radio Units (RRUs) by using SDH/OTN in Centralized Base Transceiver Station system using remote radio head (RRH) technology. The method includes: dividing the communication interface between the MU and the RRUs into a user plane and a control plane, the user plane mainly for carrying I/Q sampling data concerning the user data, and the control plane mainly for carrying the data concerning control signaling; forming the I/Q sampling data concerning the user data carried by the user plane into an I/Q data frame via an I/Q data frame adaptation layer, then forming the I/Q data frame into a GFP frame via GFP and transmitting it on SDH/OTN; and carrying the control signaling of the control plane on UDP/IP and/or TCP/IP, and further carrying IP packet on PPP and forming it into a frame by HDLC, transmitting the HDLC frame including the control plane signaling on the SDH/OTN via the control character channel of the GFP frame. According to the present invention, the existing SDH/OTN transmission network is utilized directly, which further reduces the management and maintenance operation needed for signal transmission, as well as networking cost.

13 Claims, 12 Drawing Sheets

U.S. PATENT DOCUMENTS

| | | |
|---|---|---|
| 5,657,374 A | 8/1997 | Russell et al. |
| 6,324,391 B1 | 11/2001 | Bodell |
| 6,618,599 B1 | 9/2003 | Son et al. |
| 2002/0090007 A1* | 7/2002 | Kamiya et al. ............. 370/476 |
| 2002/0122396 A1* | 9/2002 | Terasawa ................... 370/331 |
| 2003/0081550 A1* | 5/2003 | Mitchell et al. ............ 370/232 |
| 2003/0174728 A1* | 9/2003 | Kamiya et al. ............. 370/465 |
| 2004/0252720 A1* | 12/2004 | Xiong et al. ............... 370/473 |
| 2005/0107124 A1* | 5/2005 | Osterling et al. ........... 455/561 |
| 2005/0286507 A1* | 12/2005 | Sterling et al. ............. 370/363 |

OTHER PUBLICATIONS

International Search Report mailed May 19, 2005, for PCT/CN2004/000800.

http://www.cpri.info/spec.html "CPRI Common Public Radio Interface" printed Aug. 2009-4 pages.

* cited by examiner

204M installed integrately. MU and RRUs are connected to each other via broadband transmission links or network. BSC/RNC interface unit is responsible for performing user plane and signaling plane processing of the interface between BTS and BSC/RNC. The central channel processing subsystem 201 is mainly composed of a channel processing resource pool 202 and a signal route distribution unit 203, etc, wherein the channel processing resource pool 202 is formed by stacking a plurality of channel processing units 2021, 2022, ..., 202N together, and is used to perform base band signal processing, etc. The signal route distribution unit 203 dynamically distributes the channel processing resources in accordance with different cell traffics, to achieve efficient share of a plurality of cell processing resources. As illustrated in FIG. 2, besides inside the MU, the signal route distribution unit 203 can be constructed as separate equipment outside the MU. The RRUs 2041, 2042, ..., 204M are mainly composed of radio frequency power amplifiers in transmission channel, low noise amplifiers in receiving channel, and antennas, etc (not shown entirely). Typically the link between the central channel processing subsystem 201 and the Remote Radio Units (RRUs) 2041, 2042, ..., 204M can use transmission media such as optical fiber, copper cable, microwave, etc; the signals transmitted may be either sampled digital signals or modulated analog signals; the signals may be either baseband signals or intermediate frequency signals or radio frequency signals.

INTERFACE METHOD BETWEEN REMOTE RADIO UNIT AND CENTRALIZED BASE TRANSCEIVER STATION

This application claims priority from PCT/CN2004/000800 filed Jul. 13, 2004, which is incorporated herein by reference.

FIELD OF THE INVENTION

The present invention relates to a Base Transceiver Station technology used in mobile communication system, and more particularly, to an interface method between Remote Radio Unit and Centralized Radio Base Station in Centralized Base Transceiver Station system using Remote Radio Head (RRH) technology.

BACKGROUND OF THE INVENTION

1. Centralized Base Transceiver Station (CBTS) and Wireless Signal Transmission As illustrated in FIG. 1A, in mobile communication systems, wireless access network is typically composed of Base Transceiver Stations (BTSs) and Base Station Controllers (BSCs) or Radio Network Controllers (RNCs) for controlling a plurality of BTSs, wherein the BSC is mainly composed of a base band processing subsystem, a radio frequency (RF) subsystem, and an antenna etc, which is responsible for transmitting, receiving, and processing wireless signal, a BTS can cover various cells by means of a plurality of antennas, as illustrated in FIG. 1B.

In mobile communication systems, there are wireless network coverage problems that are more difficult to solve with conventional BTS technologies, such as, indoor coverage of high-rise buildings, coverage hole, or the coverage of shadow zone, RRH technology is a more effective solution being proposed to solve the above problems. In the BTS system using RRH technology, the primary radio frequency units and antennas are installed in regions that are required to provide coverage, and are connected to other units in the BTS via broadband transmission lines.

This technology can be further developed to a CBTS technology that uses RRH technology. Compared with the conventional BTS, the CBTS using RRH technology has many advantages: the centralized structure allows to use several Micro-Cells to replace a Macro-Cell based on the conventional BTS, therefore it can be adapted to various wireless environment better, and enhance wireless performances such as system capacity and coverage etc; the centralized structure enables the replacement of soft handoff in the conventional BTS by softer handoff, therefore obtains additional processing gain; the centralized structure also enables valuable base band signal processing resources to become a resource pool shared by several cells, therefore has the advantage of Statistic Multiplex, and also decreases system cost. The following patents disclose some implementation details about the CBTS using RRH technology, they are: U.S. Pat. No. 5,657,374, filed on Mar. 23, 1995, "Cellular system with centralized base stations and distributed antenna units", and U.S. Pat. No. 6,324,391, filed on Jun. 28, 1999, "Cellular communication with centralized control and signal processing", which are hereby incorporated by reference.

As illustrated in FIG. 2, the CBTS system 200 using RRH technology is composed of a central channel processing main unit (MU) (or a central channel processing subsystem) 201 and a plurality of Remote Radio Units (RRUs) 2041,

In the two BTS systems using RRH technology discussed above, the key problem to be solved is the wireless signal transmission between the RRU and the MU. Typically, analog intermediate frequency or analog radio frequency signal transmission scheme is adopted, although it is easier to adopt analog signal transmission scheme, there will be disturbing components, for example noise, etc, in analog lines, and the modulation of the signal transmitted will introduce nonlinear distortion. In addition, the analog transmission may decrease the utilization of transmission line, and hamper the implementation of large capacity multiplex technology. Therefore, it is difficult to adopt the analog transmission scheme in large scale networking.

To solve the problems, the scheme of digital signal transmission is proposed in the following two patents: Chinese patent application CN1464666, filed on Jun. 11, 2002, entitled "A soft BTS system based on remote fiber and its synchronization method", and another Chinese patent application CN1471331, filed on Jul. 2, 2003 (claimed priority of Jul. 2, 2002), entitled "The BTS system in mobile communication". The scheme of digital base band signal transmission is generally used to decrease the requirement for transmission bandwidth as much as possible. Wherein patent application CN1464666 disclosed only the simple method of using the optical fiber to transmit digital I/Q (In-phase/Quadrature) base band signal between the RRU and the main BTS, that is, the digital I/Q base band signal is converted to serial data stream by means of parallel to serial conversion at the transmitting end, and then transmitted to the receiving end by an optical transmitter, and restored to the digital I/Q base band signal by means of serial to parallel conversion after received by the optical receiver at the receiving end. Patent application CN1471331 proposed a transmission technology of using Ethernet technology in physical layer, the technology uses continuous bit stream format specially defined instead of Ethernet MAC (Media Access Control) frame. At present, a corporation organization named CPRI (Common Public Radio Interface) is also engaged in the standardization of the digital base band transmission between the RRU and the main BTS, and its technology specification can be obtained from the website http://www.cpri.info/spec.html. This technology specification adopts a technology similar to that adopted in patent CN1471331, that is, physical interface uses 1000 MB or 10 GB Ethernet standard, upper layer uses a continuous bit stream format user-defined, but CPRI only supports point to point link. Since the existing technology described above adopts specific protocol specification with regard to transmission layer technology, not mature transmission technology, many potential technology problems wait to be verified by practical systems, and the periods of technology development and product development are longer, the cost of network construction is higher, which makes it disadvantageous to be used in large scale networking.

2. Generic Framing Procedure (GFP)

Generic Framing Procedure (GFP) is recommended by ITU-T and ANSI jointly, and is used to adapt the data stream of block code or packet types to continuous byte synchronization transmission channel, typically for example the new technologies as SDH (Synchronous Digital Hierarchy) and OTN (Optical Transmission Network), the detailed technology specification thereof may refer to ITU-T G.7041 or ANSI T1X1.5/2000-024R3, which are hereby incorporated by reference. GFP can be classified into frame mapping GFP (GFP-F) that supports PDU (Protocol Data Unit) and transparent GFP (GFP-T) that supports block code, wherein the GFP-F can be used in the adaptation of protocol packet as IP/PPP (Internet Protocol/Point to Point Protocol), MPLS (Multi-Protocol Label Switching), and Ethernet MAC (Media Access Control), etc, and the GFP-T can be used to directly adapt block code character stream in 1000 MB Ethernet line, etc, accordingly, some application requirements for very little time delay can be satisfied, but the utilization of the GFP-T transfer bandwidth is lower than that of GFP-F transfer bandwidth.

In FIG. 3, a frame structure of GFP-T type is illustrated schematically. The GFP-T frame is composed of a core header and a payload part. And the payload part includes a payload header, payload and a selectable payload FCS (Frame Check Sequence). The core header includes a PL1 field indicating the payload length and a core header error control field (cHEC), wherein the cHEC is functioned as GFP frame delineation similar to ATM (Asynchronous Transfer Mode) Cell delineation, as well as provides error protection for the core header. The payload header indicates payload types and provides error protection by tHEC, wherein Payload Type Identifier (PTI) indicates that the GFP-T frame carries user data when it is "000", and indicates that the GFP-T frame carries client management information when it is "100", payload FCS indicator (PFI) indicates if there is a payload FCS, User Payload Identifier (UPI) and the PTI together indicate the types of user data or client management information in the payload. In addition, the Extension Header Identifier (EXI) indicates the presence of a selectable extension header and its type. At present, a typical use of the extension header is providing channel identifier (CID), therefore supporting the multiplex of multiple separate client signals. As illustrated in FIG. 3, the payload in the GFP-T frame is super block with fixed length which is formed by 64B/65B code block according to certain sequence. Since the direct adaptation of the transparent GFP now uses block code character stream of an 8B/10B line code, 64B/65B code block includes user data character and control character, so a flag bit is used to indicate if there is a control character in the 64B/65B code block. Wherein the high 4 bits of the control character are used as the following control character indication and the position indication of the control code in the original 8B/10B code stream, and the low 4 bits are used to transmit the control code itself.

To ensure the transmission of the client signal, the bandwidth of the transmission channel, for example SDH/OTN, etc, should be a little wider than the bandwidth required by the GFP frame. Since the size of each super block in the GFP-T frame is 536 bits, the bit length of the GFP-T frame, L can be denoted as:

$$L = L_{overhead} + 536 \cdot N \quad (1)$$

where N is the number of the super blocks in the GFP-T frame, $L_{overhead}$ is the overhead length of the core header, the payload header and the selectable payload FCS, etc, in the GFP-T frame. If the original client signal rate is $B_C$ bit/s, and the transmission channel bandwidth of SDH/OTN, etc, is $B_T$ bit/s, with consideration that each super block can carry a client signal stream of 512 bits, the number of the super blocks in the GFP-T, N should satisfy the following expression:

$$\frac{L}{B_T} < \frac{512 \cdot N}{B_C} \quad (2)$$

So the minimum number of the super blocks required by GFP-T to satisfy the above condition, N is:

$$N_{min} = \left\lceil \frac{B_C L_{overhead}}{512 B_T - 536 B_C} \right\rceil \quad (3)$$

where symbol $\lceil x \rceil$ indicates the minimum integer larger than or equal to x.

SUMMARY OF THE INVENTION

To solve the problems with the wireless signal transmission between the RRU and the main BTS in the existing technology, it is therefore an object of the present invention to provide an interface method between RRU and MU in CBTS system using RRH technology. The invention proposed a method for transmitting digital wireless signal between RRU and MU based on GFP technology. The method directly uses mature Synchronous Digital Hierarchy (SDH)/Optical Transmission Network (OTN) Transmission network technology to realize digital wireless signal transmission between RRU and main BTS without the need for specific transmission technology, therefore further reduces the management and maintenance operation needed for signal transmission as well as networking cost.

According to one aspect of the present invention, it is proposed a method for transmitting signal between a central channel processing Main Unit (MU) and one or more Remote Radio Units (RRUs) in Centralized Base Transceiver Station system using remote radio head (RRH) technology. Wherein the transmission channel between the MU and the one or more RRUs uses Synchronous Digital Hierarchy (SDH)/Optical Transmission Network (OTN), the method comprising: dividing the communication interface between the MU and the RRUs (RRUs) into a user plane and a control plane, the user plane mainly for carrying I/Q sampling data concerning the user data, and the control plane mainly for carrying the data concerning the control signaling; forming the I/Q sampling data concerning the user data carried by the user plane into an I/Q data frame via an I/Q data frame adaptation layer, then forming the I/Q data frame into a GFP frame via Generic Framing Procedure (GFP) and transmitting it on SDH/OTN; and carrying the control signaling of the control plane on User Data Protocol (UDP)/Internet Protocol (IP) and/or Transmission Control Protocol (TCP)/Internet Protocol (IP), and further carrying IP packet on PPP and forming it into a frame by High-Level Data Link Control (HDLC), transmitting the HDLC frame including the control plane signaling on the SDH/OTN via GFP control character channel.

BRIEF DESCRIPTION OF THE DRAWINGS

The invention will be better understood when reading the preferred embodiments of the invention in conjunction with accompanying drawings, therefore the benefits, features, and advantageous effects of the present invention will become more evident, wherein.

DESCRIPTION OF THE PREFERRED EMBODIMENTS

The objectives, benefits, and advantageous effects of the present invention, will be more clearly understood from the following detailed description of the invention taken in conjunction with the accompanying drawings.

1. Wireless Signal Transmission and RRU-MU Interface Protocol

Figure 1A:
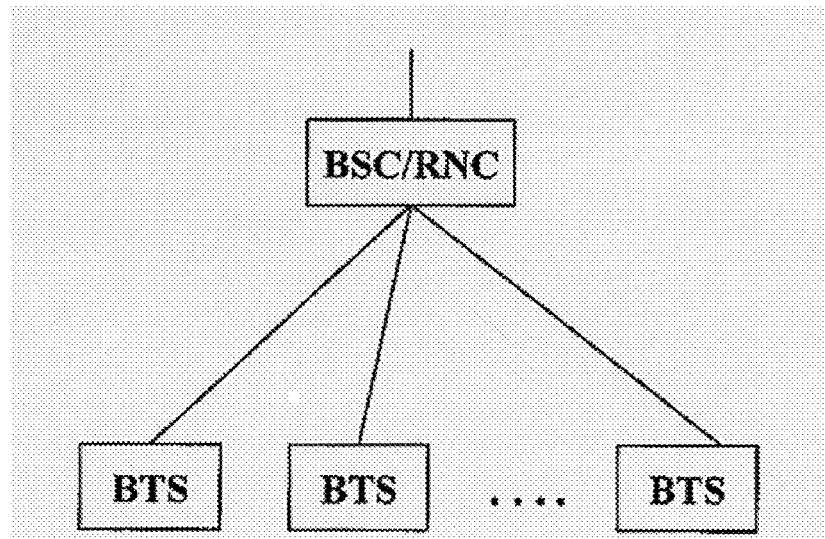
FIG. 1A schematically shows the structure of a wireless access network in a conventional mobile communication system.
Figure 1B:
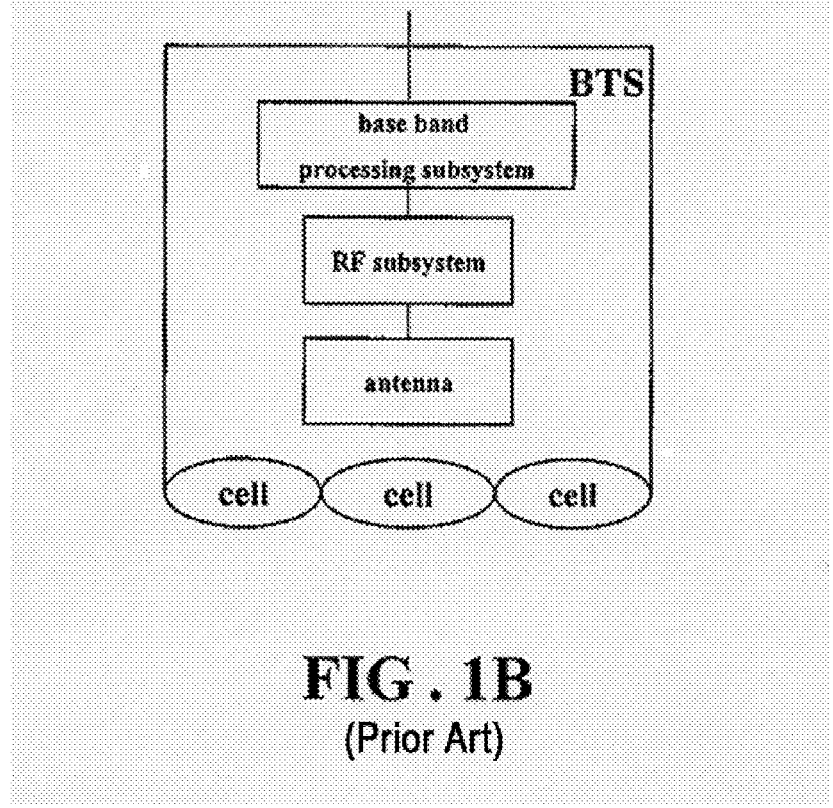
FIG. 1B schematically shows the basic structure of a BTS system in the conventional mobile communication system.
Figure 2:
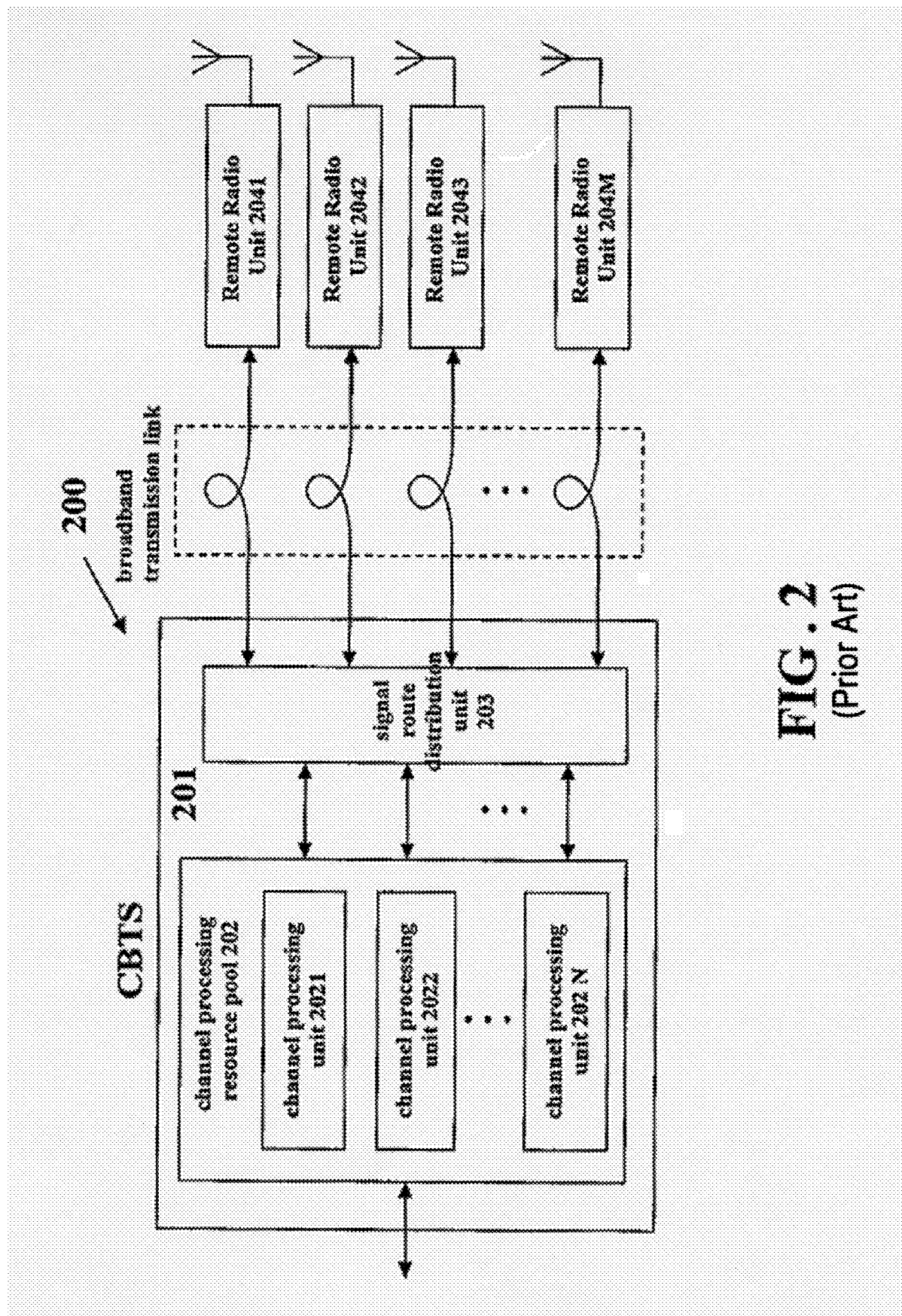
FIG. 2 schematically shows the structure of a CBTS system using RRH technology.
Figure 3:
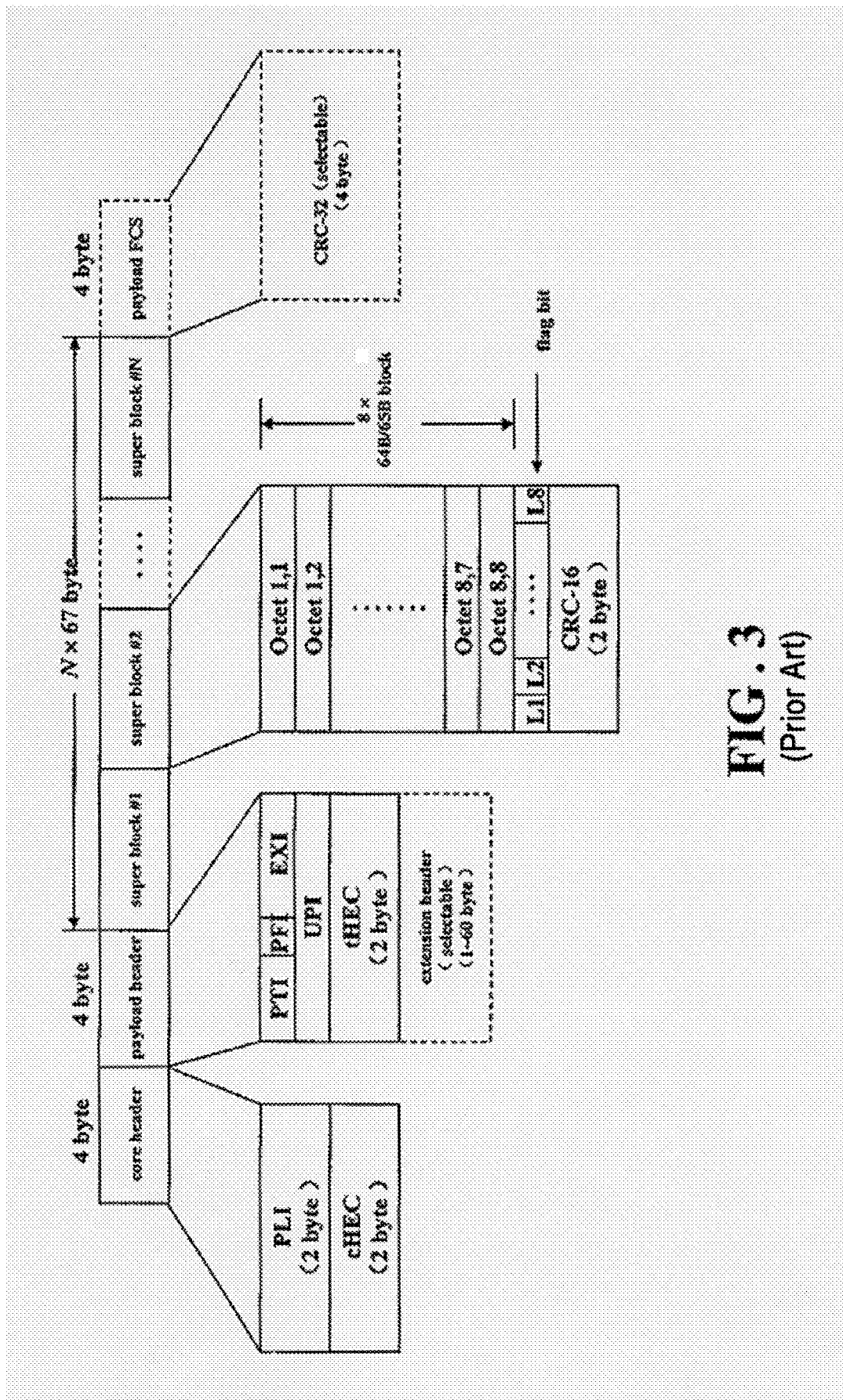
FIG. 3 schematically shows a GFP-T frame structure for block code character stream according to GFP.
Figure 4:
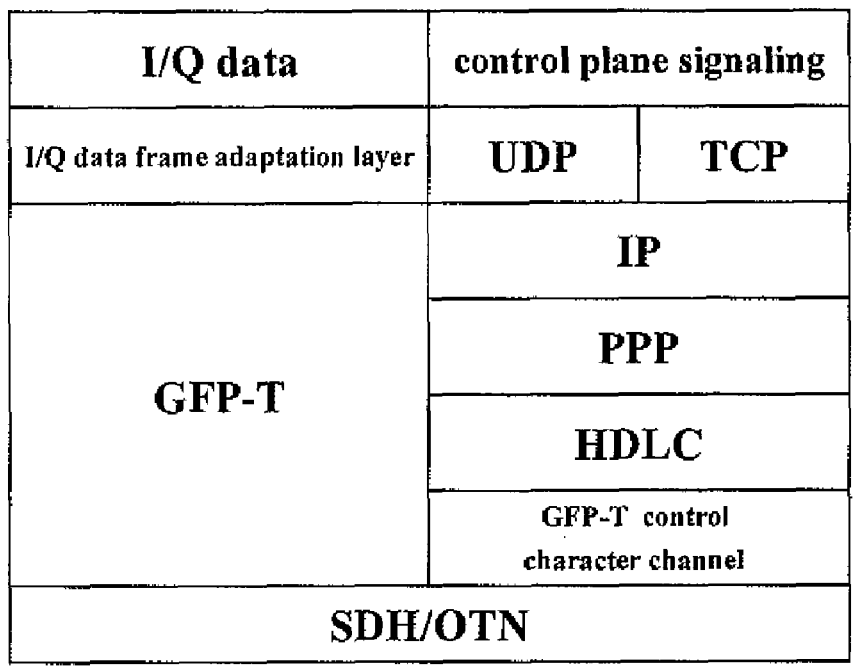
FIG. 4 schematically shows the structure of the interface between a RRU and a central channel processing main unit according to a preferred embodiment of the present invention.

FIG. 4 shows the structure of the RRU-MU interface protocol according to the present invention. The interface is composed of user plane and control plane. Wherein the user plane mainly carries the I/Q sampling data concerning the user data. The I/Q sampling data are firstly formed into I/Q data frame via an I/Q data frame adaptation layer, and then transmitted on SDH/OTN via GFP-T. The control signaling of the control plane is carried on UDP (User Data Protocol)/IP and/or TCP (Transmission Control Protocol)/IP, and IP packet is carried on PPP and formed into a frame by HDLC (High-Level Data Link Control). At last the HDLC frame including the control plane signaling is transmitted on SDH/OTN via GFP-T control character channel.

A RRU can typically support one or more carrier frequencies, so the RRU-MU interface protocol should support the transmission of a plurality of carrier frequency wireless signals. In addition, in practical wireless BTS system, multi-antenna technology is adopted more frequently to achieve enhanced wireless performance. The multi-antenna technology includes technologies such as transmitting diversity, receive diversity, Multi-antenna transmitting/receive (MIMO) and Smart Antenna or Array Antenna, etc. In the wireless BTS system adopting multi-antenna technology, there is strict time and phrase relation among respective antenna signals, so the transmission time delays of respective antenna signals are required to be the same during transmission. Therefore the RRU-MU interface protocol should support the transmission of multi-antenna signals corresponding to the same carrier frequency, and ensure that the transmission time delays of respective antenna signals are the same during transmission.

Figure 5:
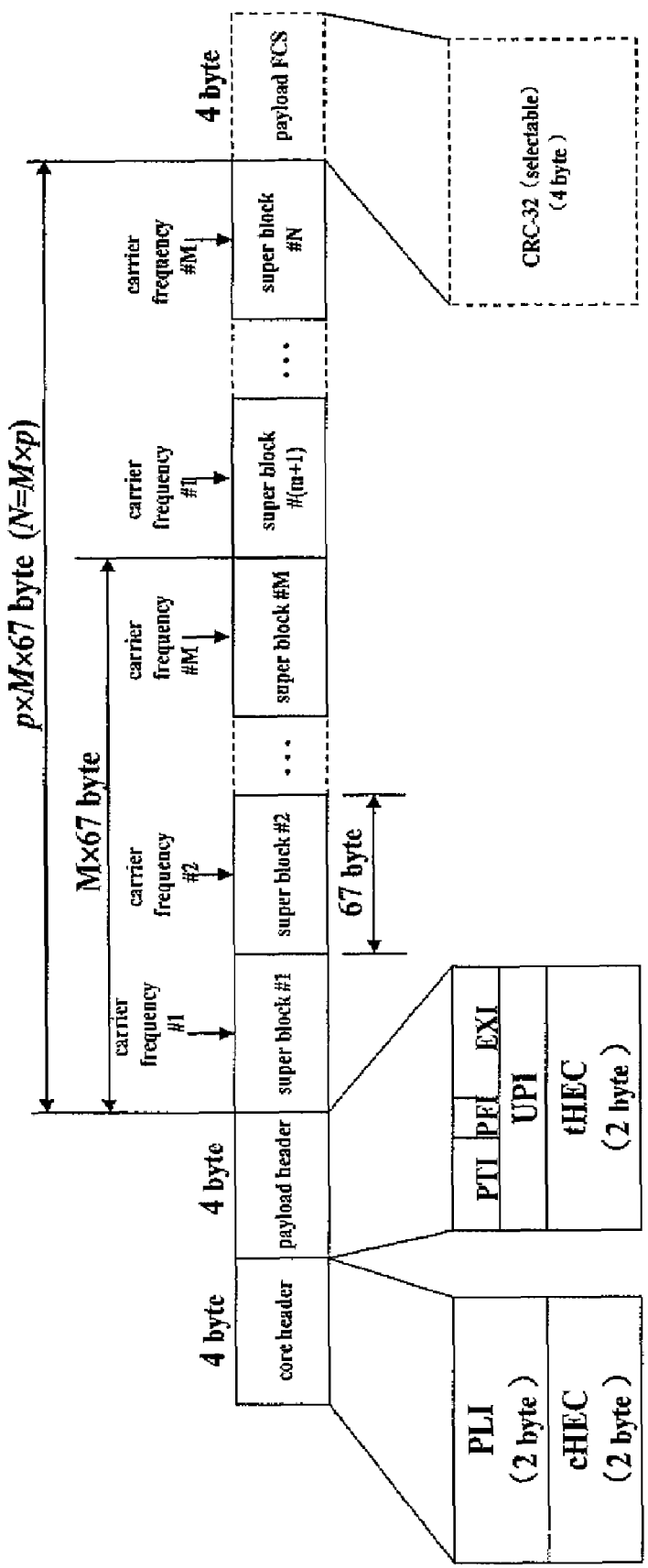
FIG. 5 is the GFP frame structure of the interface mode between a RRU and a central channel processing main unit according to a preferred embodiment of the present invention.

Therefore, according to the present invention, FIG. 5 shows a GFP frame structure of a preferred RRU-MU interface mode. In this interface mode, the wireless signals corresponding to M (M≧1) carrier frequencies of a RRU are transmitted by different super blocks using time division multiplex. In the GFP-T frame adopted in the interface mode shown in FIG. 5, core header and payload header which are 8 bytes in all comply with the GFP standard of ITU-T/ANSI without using extension header, payload FCS is optional, in GFP-T frame payload, the initial M super blocks (M×67 bytes) correspond to M different carrier frequencies respectively, and this structure is repeated p (P≧1) times sequentially, so the total number N of the super blocks in a GFP-T frame is pM. This scheme is practically M carrier frequencies time division multiplexing the transmission bandwidth of GFP-T, and the transmission of respective carrier frequency wireless signals are independent with each other.

Figure 6:
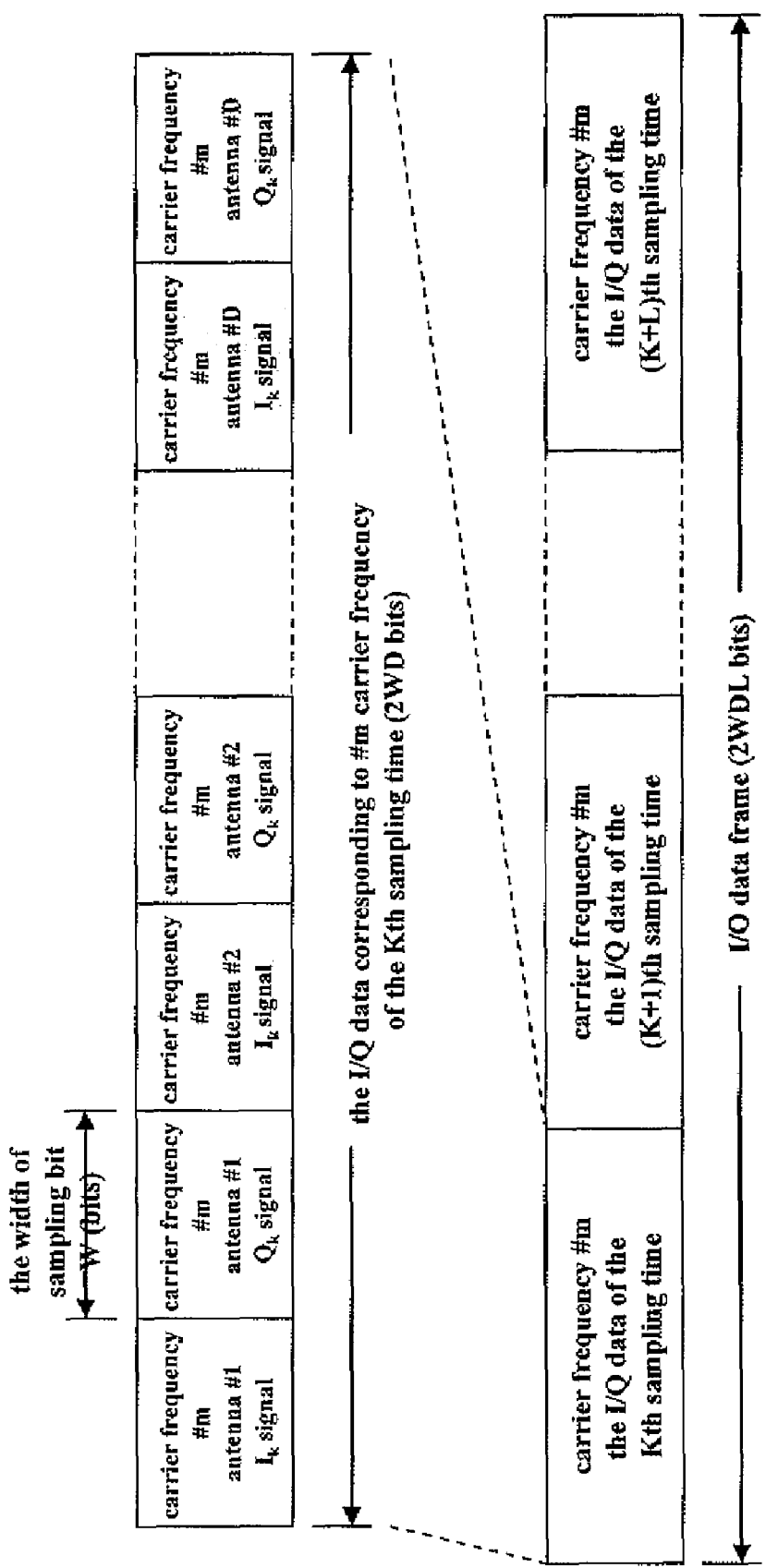
FIG. 6 is the I/Q data frame structure of the interface mode shown in FIG. 5.

FIG. 6 shows the I/Q data frame format of such interface mode. Firstly, the I/Q baseband signals of carrier frequency #m (m=1, 2, ... M) from respective antennas are sequentially arranged at the same sampling time, wherein the sequence of the sampling values of the I/Q baseband signals from respective antennas is the same with the spatial location sequence of antenna array or antenna group, the sampling values of the I/Q baseband signals from the same antenna are sequentially arranged according to quadrature component sampling values and In-phase component sampling values. Therefore, if the number of the antennas is D, sampling bit width is W (typically is 4~20), then at a certain sampling time, the I/Q data length of the carrier frequency is 2WD bits. AN I/Q data frame is composed of L I/Q data corresponding to the carrier frequency, wherein L I/Q data are sequentially arranged according to sampling time increment, so the total bit length is 2WDL. Since in GFP-T framing, alignment method is based on byte, the bit length of an I/Q data frame should be multiple of 8, that is, the length should be WDL/4 bytes, meanwhile the length of the I/Q data frame should be as short as possible, so as to reduce the inherent time delay induced during framing process. Since the sampling bit width and the number of the antennas are fixed, L is the minimal value which makes WDL/4 to be integral. For example, the antenna number D of a certain RRU is 2, sampling bit width W is 11, then L=2, and the length of the I/Q data frame is 11 bytes.

Figure 7:
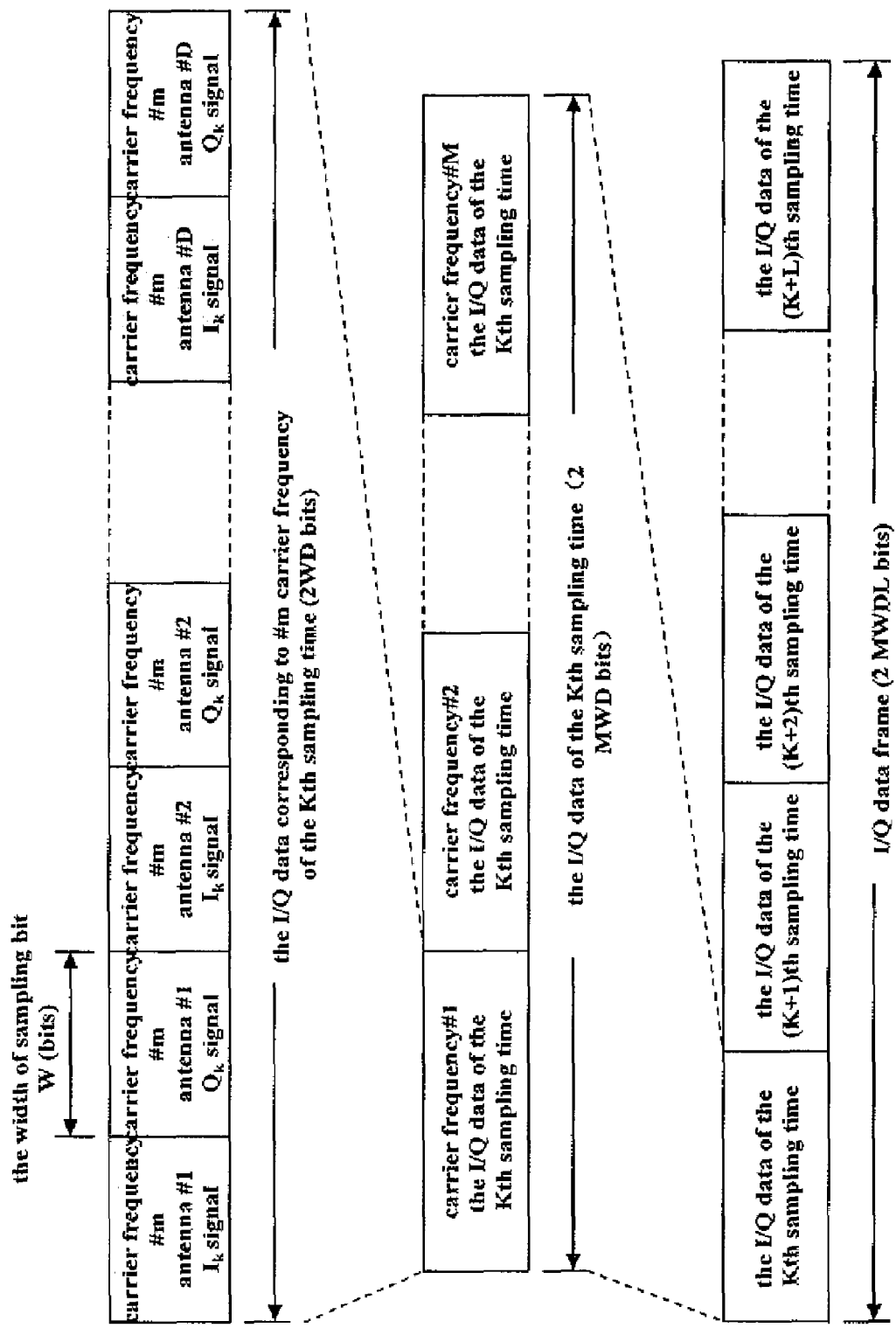
FIG. 7 is the I/Q data frame structure of the interface mode between a RRU and a central channel processing main unit according to another preferred embodiment of the present invention.

FIG. 7 shows the I/Q data frame format of another preferred RRU-MU interface mode. In this interface mode, the wireless signals corresponding to M (M≧1) carrier frequencies of a RRU are multiplexed according to the I/Q data frame format shown in FIG. 7, and then transmitted via GFP-T. Specifically, the I/Q baseband signals of carrier frequency #m (m=1, 2, . . . M) from respective antennas are sequentially arrange firstly at the same sampling time, wherein the sequence of the sampling values of the I/Q baseband signals from respective antennas is the same with the spatial location sequence of antenna array or antenna group, the sampling values of the I/Q baseband signals from the same antenna are sequentially arranged according to quadrature component sampling values and In-phase component sampling values. Thus, at certain sampling time, the I/Q data length of the carrier frequency is 2WD bits; then M I/Q data with the same sampling time from M carrier frequencies are sequentially arranged to form a data block with length being 2MWD bits. At last, L such data blocks are sequentially arranged according to sampling time increment to form an I/Q data frame, so the total bit length is 2 MWDL. For the same reason, L is the minimal value which makes M WDL/4 to be integral. For example, the antenna number D of a certain RRU is 2, sampling bit width W is 11, and the number of the carrier frequencies M is 3, then L=2, and the length of the I/Q data frame is 33 bytes.

Figure 8A:
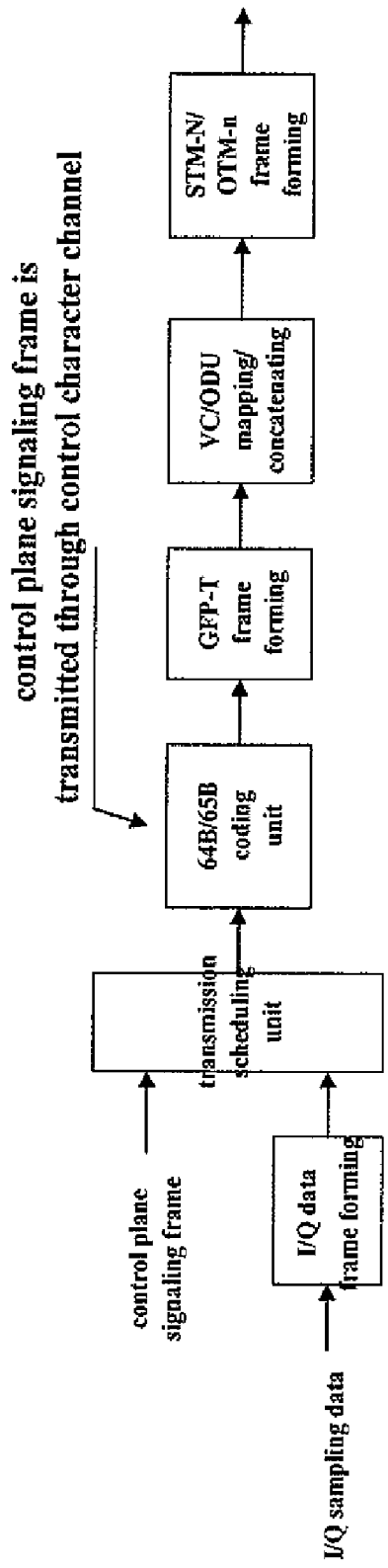
FIG. 8A, 8B schematically shows the structures of the transmitting end and the receiving end respectively, when using the control character in GFP-T client data frame to transmit control plane signaling frame data, in the interface mode between a RRU and a central channel processing main unit according to FIG. 4.

In the RRU-MU interface protocol structure shown in FIG. 4, the transmission of I/Q data frame and control plane signaling frame is, for example, shown in FIG. 8A. At the transmitting end, I/Q data is formed into I/Q data frame via an I/Q data frame adaptation layer, then the I/Q data frame is processed by a transmission scheduling unit and is mapped to 64B/65B code block by a 64B/65B coding unit, to form a GFP-T client data frame. The 64B/65B code block includes two kinds of control characters, that is padding character and control plane signaling frame character, as well as the data character of the I/Q data frame. The transmission scheduling unit is responsible for the transmission scheduling of the I/Q data frame and the control plane signaling frame. Specifically, the control plane signaling frame character enters into the 64B/65B coding unit according to the following scheduling method: when the I/Q data frame character stream input buffer is null, if the control plane signaling frame input buffer is not null, the control plane signaling frame enters into the 64B/65B coding unit as control character, otherwise it is padded by the padding character. Then the GFP-T frame is formed and then is formed into VC (Virtual Container)/ODU (Optical Channel Data Unit) by a VC/ODU Mapping/concatenating unit, and is further formed into a STM-N/OTM-n frame, to realize the transmission based on SDH/OTN.

Figure 8B:
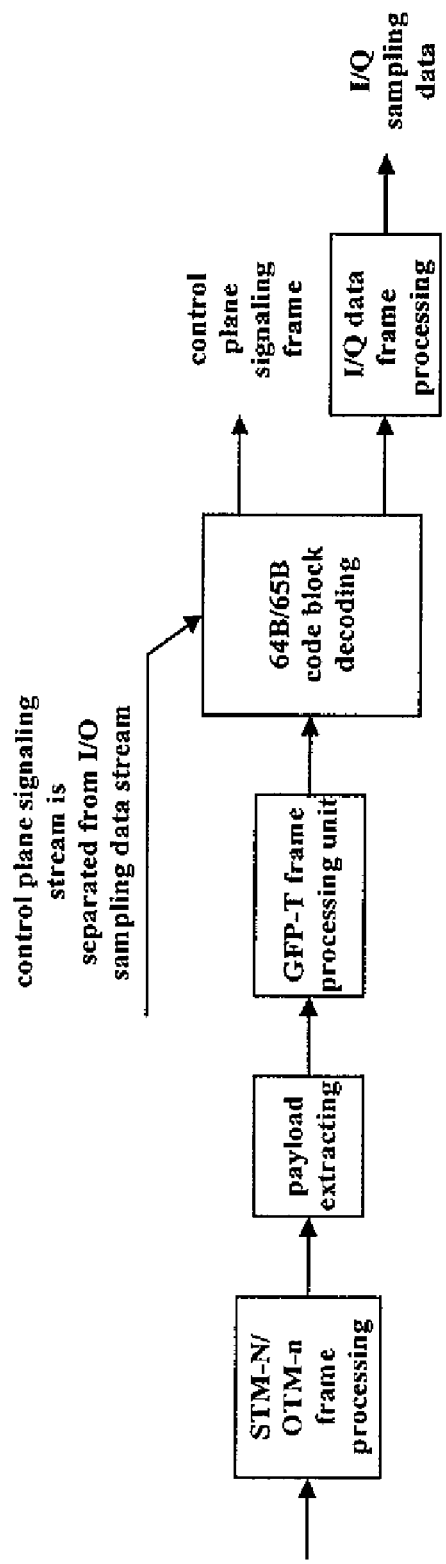

The processes at the receiving end are inverse processes of the transmitting end, as shown in FIG. 8B. Firstly, the corresponding VC/ODU is separated from the STM-N/OTM-n frame and then payload thereof is extracted, the 64B/65B code blocks are obtained after being processed by a GFP-T frame processing unit, then the I/Q data frame character stream and the control plane signaling frame character stream are separated by a 64B/65B decoding unit. Wherein the I/Q data frame character stream is further processed by an I/Q data frame processing unit to obtain the I/Q data streams of respective carrier frequencies from respective antennas, and the control plane signaling frame character stream is further processed according to the protocols of various layers of the control plane as shown in FIG. 4.

For the two different RRU-MU interface modes described above, the difference is in that the modes adopted in multiplexing the I/Q data frames on the GFP-T frame are different. With regard to the first RRU-MU interface mode, at the transmitting end the corresponding I/Q data frames are formed for various carrier frequencies, and then transmitted by various super blocks, while at the receiving end various carrier frequencies are distinguished according to various super blocks, at the same time, the I/Q data frame character streams separated by the 64B/65B decoding unit are processed by the I/Q data frame processing unit to obtain the I/Q data streams of the respective antennas of the corresponding carrier frequencies. With regard to the second RRU-MU interface mode, at the transmitting end, the I/Q data of the respective antennas of different carrier frequencies are together formed into I/Q data frame, while at the receiving end the I/Q data frame character streams separated by the 64B/65B decoding unit are processed by the I/Q data frame processing unit to obtain the I/Q data streams of respective antennas of various carrier frequencies.

Figure 9:
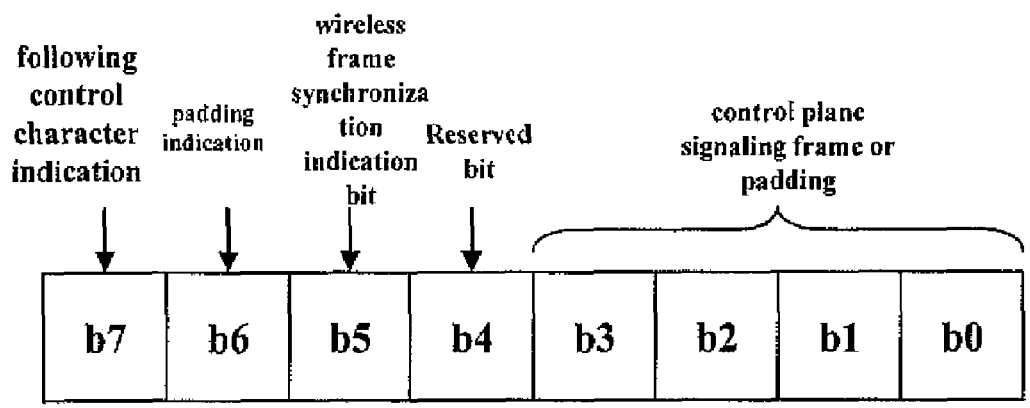
FIG. 9 schematically shows the definition of control character according to the present invention.

As discussed previously, in GFP code, only the low 4 bits of the control character in the 64B/65B code block are used to transmit control code, whereas the high 4 bits are used as the following control character indication and the position identifier of the control code in the original 8B/10B code stream. Since the present invention does not use 8B/10B coding, the control character has only one usage to transmit the control plane signaling frame besides being the padding character, therefore it is necessary to redefine the bits of the control character. As a nonrestrictive example for illustrating, FIG. 9 shows a kind of definition for the control character, wherein the definition of the most significant bit b7 is the same with that in the original GFP code, i.e. indicating whether the following bytes in the 64B/65B code block is the control character, b6 is used to indicate if the control character is the padding character, b5 is used as wireless frame synchronization indication (which will be described in detail hereinafter), b4 is reserved for the future protocol extension, and the low 4 bits are used to transmit the control plane signaling frame character stream. Wherein when b6 indicates that the control character is padding character, the low 4 bits can be of any values, and will be omitted as padding character at the receiving end.

According to the present invention, GFP client management frame can also be used to inspect and maintain the GFP transmission link of the RRU-MU interface. The usage of the GFP client management frame complies with the GFP standard of ITU-T/ANSI. In the present GFP standard, the GFP client management frame carries two kinds of client management information, namely client signal failure (lose client signal) and client signal failure (lose client character synchronization). The client management information is used to inform the transmitting/receiving end in time to perform re-synchronizing to restore the normal link communication in the case that there are serious transmission errors or GFP frame asynchronization (GFP frame delineation failure) in the client signals.

In addition, in the BTS system using RRH technology, RRU management and control information has at least three kinds of information: RRU-MU interface link control, management and maintenance signaling, including control signaling such as link set-up, modification, and deletion, operation mode negotiation, rate negotiation, I/Q data frame format negotiation, etc; the parameter setup, on-off control, status inspection and alarm of respective RRU radio models; and RRU operation and maintenance information, for example, software/firmware upgrade, configuration management, etc. According to the present invention, except the operations with strict timing requirement such as on-off control of RRU radio model (which will be described in detail hereinafter), other management and control information described above is within the control plane of the RRU-MU interface protocol shown in FIG. 4. The control plane signaling is carried on UDP/IP and/or TCP/IP. A typical example of the control plane signaling carried on UDP/IP is SNMP (Simple Network Management Protocol) message, and a typical example carried on TCP/IP is HTTP (HyperText Transfer Protocol), Telnet, and other control signaling described above. As discussed previously, the control plane signaling is transmitted on SDH/OTN via GFP-T control character channel, and at the receiving end, even though the control plane signaling stream can be extracted from the GFP-T control character channel, the GFP-T control character channel itself can't provide link layer functions including packet delineation, reliable transmission, so the above IP packet carrying the control plane signaling will further be carried on PPP and formed into frame by HDLC.

2. Wireless Frame Synchronization and RTT Estimation

Figure 10:
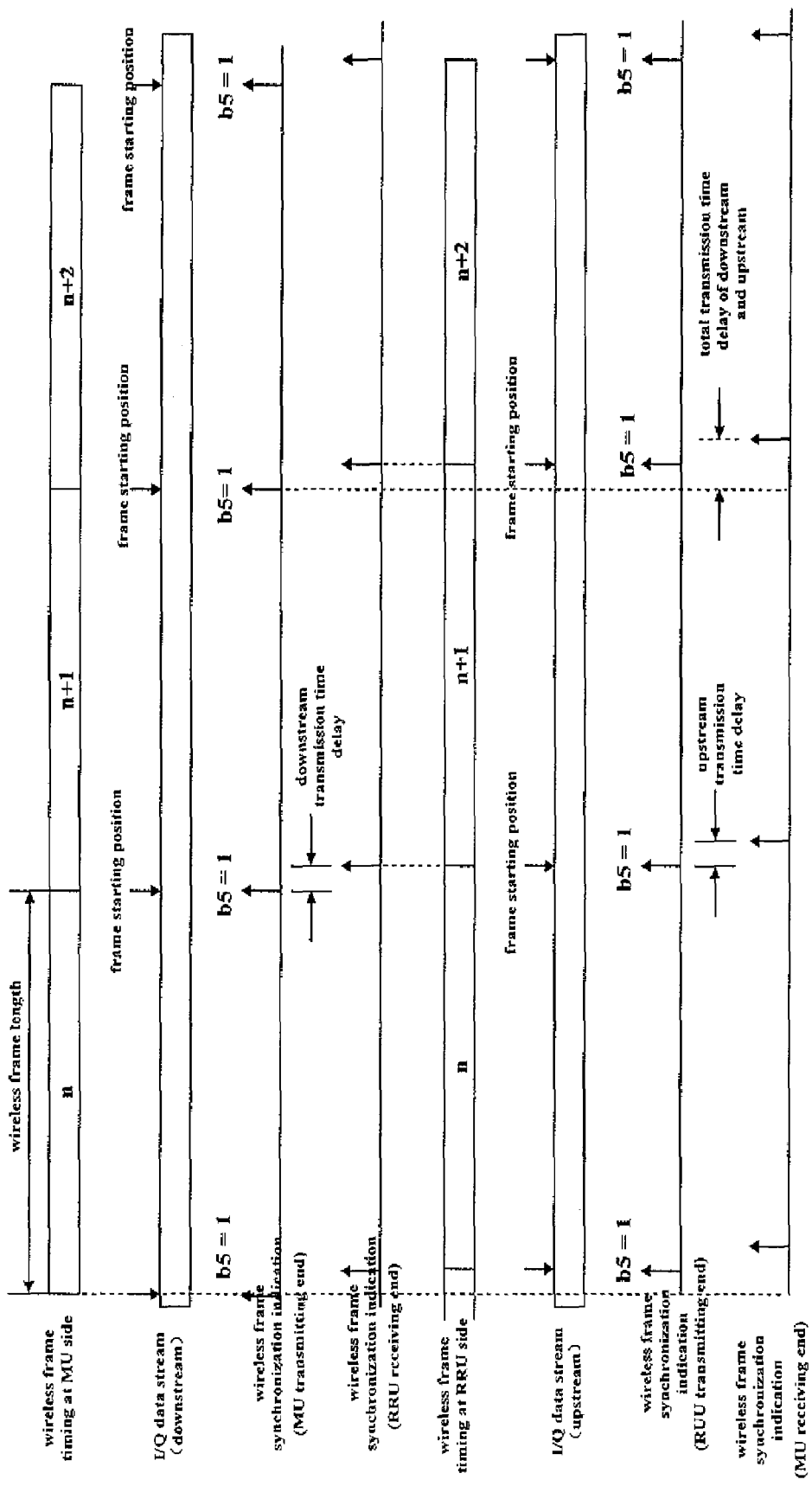
FIG. 10 schematically shows the illustration for wireless frames synchronization and measurement of round trip transmission time delay according to the present invention.

As discussed previously, the present invention defines a bit for the wireless frame synchronization indication in the definition of the control character, the bit defined can be used to synchronize the wireless frames and measure round trip transmission time delay (RTT), the principle thereof is shown in FIG. 10.

At first, the wireless frame timing at MU side is timing reference for all RRUs linked with the MU. In down stream, downstream I/Q data stream is send to the RRU via GFP-T, when wireless frame starting time at MU side appears, if the padding character is transmitted now, the wireless frame synchronization indication bit (b5 in FIG. 9) of this character is set to "1", if the I/Q data frame character is transmitted now, insert a padding character at this time immediately and set the wireless frame synchronization indication bit of this character to "1". The time that the RRU receives the control character with its wireless frame synchronization indication bit set to "1" will be the wireless frame starting time at RRU side. There is certain delay between the wireless frame timing at RRU side and that at MU side because of transmission time delay.

In up stream, upstream I/Q data stream is also send to the MU via GFP-T, once RRU has received the wireless frame synchronization indication of downstream, if the padding character is transmitted now, the wireless frame synchronization indication bit (b5 in FIG. 9) of this character is set to "1", if the I/Q data frame character is transmitted now, insert a padding character at this time immediately and set the wireless frame synchronization indication bit of this character to "1". Similarly, there is certain delay between the wireless frame synchronization indication received by the MU from the RRU and the wireless frame timing at RRU side because of transmission time delay. In this way, round trip transmission time delay (RTT) estimation can be obtained by calculating the difference between the wireless frame starting time fed back by the RRU and the starting time of the original wireless frame timing in the MU.

The object for the RRU to obtain wireless frame timing is that, since the RRU radio models (such as radio power amplifier, frequency synthesizing unit, etc) often need period control signal with strict timing requirement based on wireless frame timing, to perform the operations concerning on-off control and mode transition of radio models, and transmitting/receiving switch in TDD (Time Division Duplex) system, etc, the RRU can generate the above signals periodically and locally by using the wireless frame timing obtained (the starting and stopping time of various control signals can be configured and modified as parameters by above control plane signaling).

In addition, since there is certain delay jitter in transmission, there may be certain jitter in the wireless frame synchronization indication received by each RRU frame, therefore the periodicity of the wireless frame timing can be used to perform Smooth Processing, to achieve accurate wireless frame timing at RRU side.

3. RRU Time Delay Adjustment

As for wireless interface technology in TDD mode, it is necessary to ensure that the upstream receiving and downstream transmitting performed by respective RRUs should be synchronized. Because the asynchronization of transmitting/receiving timing of upstream and downstream in various cells of TDD system will cause interference of transmitting/receiving time slot in various cells, which will influence the advanced timing adjustment in cell handover, therefore, the synchronization of respective RRU wireless frame timing must be ensured. The discussion about synchronization between various cells in TDD system may refer to 3GPP (3rd-Generation Partnership Project) "*TR*25.836, *NodeB Synchronization for TDD*". With regard to the wireless interface technology in FDD (Frequency Division Duplex), RRU time delay adjustment may not be performed if strict wireless frame synchronization between various cells is not required, and may be performed if required.

Because of different transmission time delays, the wireless frame timing obtained by respective RRUs from MU by using the above method is different, therefore for the TDD system, RRU time delay adjustment is required to ensure wireless frame timing synchronized between various cells in CBTS. To this end, according to the present invention, the MU can send the wireless frame timing to respective RRUs relatively earlier or later by using the obtained RRT measurements of respective RRU to make the wireless frame timing of respective RRUs to be the same, so as to continuously track the RRT variation of respective RRUs and to keep the wireless frame timing synchronized among respective RRUs.

Figure 11A:
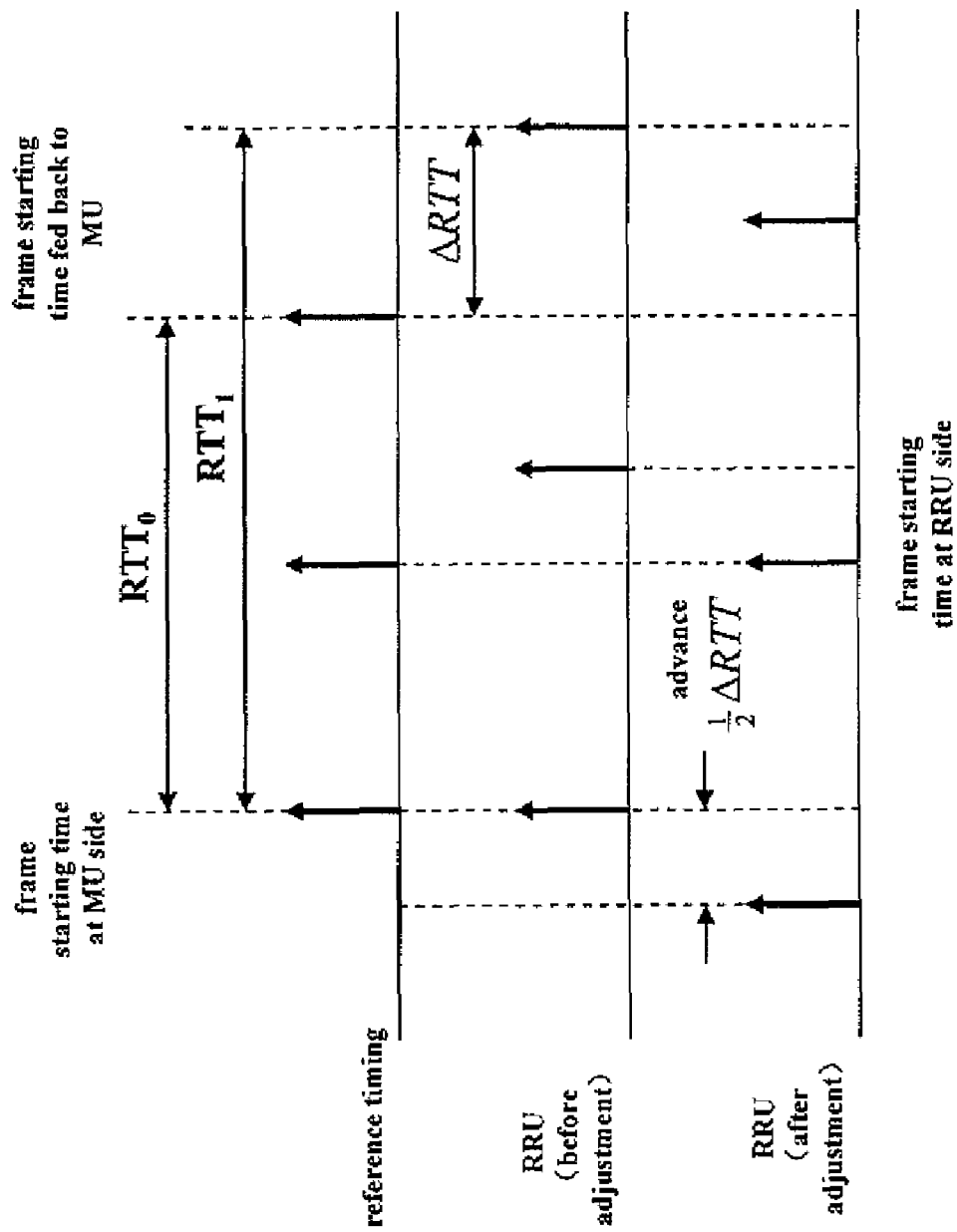
FIG. 11A, 11B schematically shows the illustration of time delay adjustment based on RTT measurement according to the present invention.
Figure 11B:
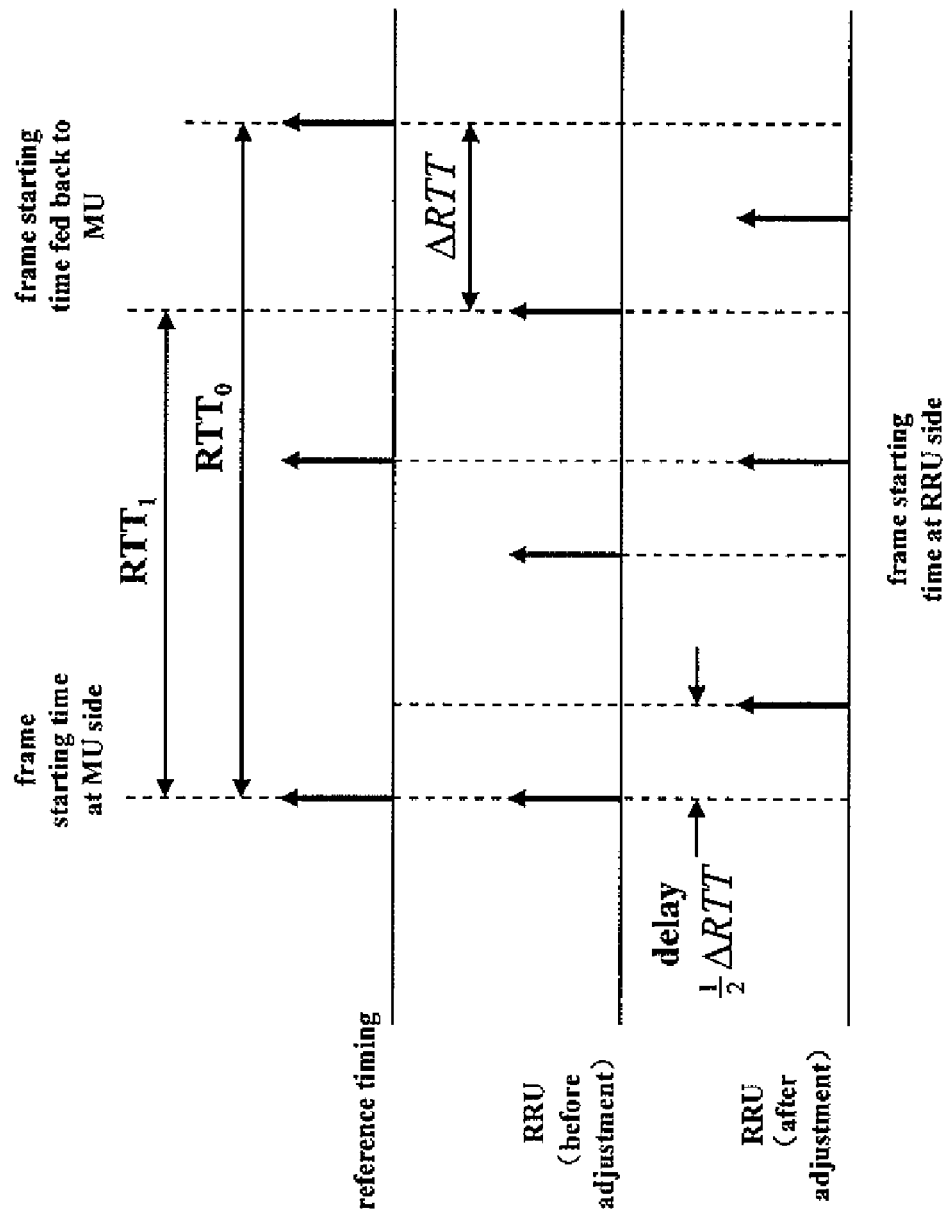

FIG. 11 schematically shows the time delay adjustment based on RTT measurement. In FIG. 11, the topside graph is reference timing, the middle is the timing of a certain RRU before time delay adjustment, and the underside is the timing of the RRU after time delay adjustment, the arrow on the left points at the frame starting time corresponding to respective RRUs at MU side, the arrow in the middle points at the frame starting time received at RRU side, and the arrow on the right points at the frame starting time fed back to the MU by the RRU, the round trip transmission time delay of reference timing is $RTT_0$, the round trip transmission time delay of the RRU is $RTT_1$. In FIG. 11A, $RTT_1$ of the RRU is longer than $RTT_0$ of the reference timing, that is, $\Delta RTT=RTT_1-RTT_2>0$, therefore the MU has to advance the frame starting time sent to the RRU by $\frac{1}{2}\Delta RTT$, to ensure that the frame starting time receive at RRU side is aligned with the reference timing. The case of FIG. 11B is contrary to that of FIG. 11A, $RTT_1$ of the RRU is shorter than $RTT_0$ of the reference timing, that is, $\Delta RTT=RTT_1-RTT_2>0$, therefore the MU has to delay the frame starting time sent to the $\frac{1}{2}\Delta RTT$, to ensure that the frame starting time received at RRU side is aligned with the reference timing.

In fact the time delay adjustment above assumes that the transmission time delay in up stream is the same with that in down stream, which is adapted to most applications, but if the transmission time delay in up stream is different with that in down stream in specific application, an adjustment factor may be added to the advanced/delay value of wireless frame timing sent to respective RRUs, that is, being corrected to ½(1+ γ)ΔRTT, where −1<γ<1, the adjustment factor can be determined by empirical value measured. In addition, the reference timing in the above time delay adjustment is a reference for the time delay adjustments of all RRUs, whereas value selection of the reference timing will not influence relative timing synchronization among respective RRUs, but average frame starting time corresponding to respective RRUs at MU side, therefore the above reference timing is determined by average frame starting time corresponding to respective RRUs at MU side.

4. Sampling Clock Recovery and Frequency Synchronization

In the mobile communication system, the frequency stability of the BTS radio frequency unit is required to be relatively high, generally with an accuracy of 0.05 ppm, therefore the RRU requires the frequency reference with high stability. Meanwhile, since the I/Q data stream is transmitted to the receiving end via asynchronous GFP-T channel, in order to re-build I/Q data stream at the receiving end, it is necessary to recover or obtain the bit synchronization clock of the I/Q data stream synchronous with that of the transmitting end.

In the BTS system using RRH technology, the MU can always obtain the frequency reference with high stability, whereas the RRU has to recover or obtain synchronous clock with high stability. On the one hand, to provide the required frequency reference to radio frequency part, and on the other hand, to re-build the downstream digital wireless signal data stream and generate the upstream wireless signal data stream by using it. Therefore, two different methods can be used to get digital wireless signal data stream bit timing and the frequency reference with high stability required by the RRU. One method is adopting global common clock, and a typical implementation is that both the MU and respective RRUs get frequency reference with high stability from GPS (Global Positioning System), and then use this frequency reference as the sampling clock source of the digital wireless signal data stream. Another method is adopting adaptive clock recovery which technology use the feature that the continuous data stream transmitted itself has constant bit rate to recover the clock for the constant data stream through Phase Locked Loop (PLL), as shown in FIG. 12.

Figure 12:
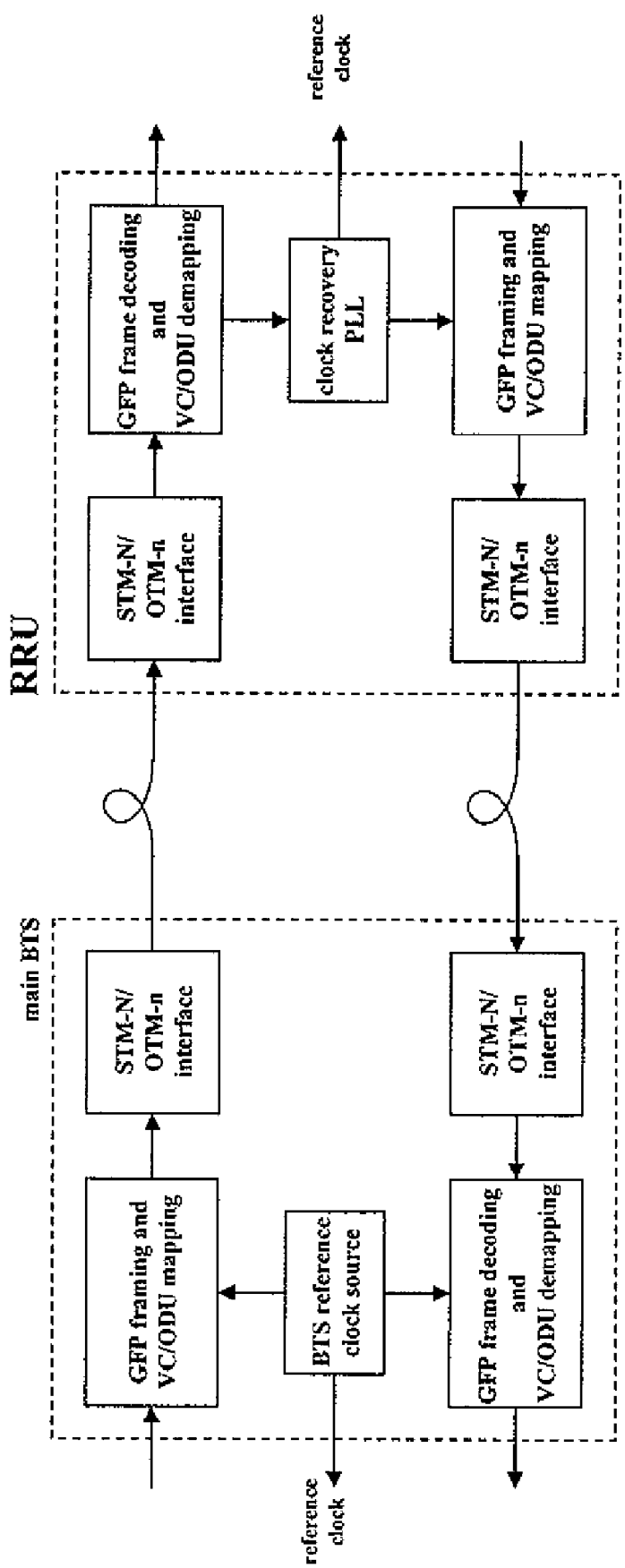
FIG. 12 schematically shows clock recovery and RRU timing according to the present invention.

In FIG. 12, the MU uses the reference clock source with high stability, besides providing timing for the MU itself, in down stream, this reference clock source provides timing for the GFP-T framing and VC/ODU mapping model, etc, provided at the transmitting end of the MU-RRU interface at MU side, and the receiving end at RRU side recovers the digital wireless signal data stream clock using the PLL based on FIFO (First In First Out), meanwhile the clock is also the reference frequency source of the RRU. In up stream, the GFP-T framing and VC/ODU mapping model, etc, provided at the transmitting end of the MU-RRU interface at RRU side send data using the synchronization clock obtained in down stream, and the receiving end at MU side provides timing for the GFP-T frame decoding and VC/ODU demapping model, etc, using the above reference clock source in the MU. In addition, the clock for the STM-N/OTM-n interface at the transmitting/receiving end is directly extracted from SDH/OTN line, instead of using the above client data clock.

The interface method between RRU and CBTS of the present invention are disclosed above in conjunction with the accompanying figures, but the disclosures are intended not to limit the invention. Those skilled in the art will recognize that various modifications and improvements may be made to the invention according to the principle of the invention, without departing from the scope of the appended claims of the invention.

What is claimed is:

1. A method for transmitting signal between a central channel processing Main Unit (MU) and one or more Remote Radio Units (RRUs) in Centralized Base Transceiver Station system using remote radio head (RRH) technology, wherein the transmission channel between the central channel processing Main Unit (MU) and the one or more RRUs uses Synchronous Digital Hierarchy (SDH)/Optical Transmission Network (OTN), the method comprising:

dividing the communication interface between the MU and the RRUs into a user plane and a control plane, the user plane mainly for carrying I/Q sampling data concerning the user data, and the control plane mainly for carrying the data concerning control signaling;

forming the I/Q sampling data concerning the user data carried by the user plane into an I/Q data frame via an I/Q data frame adaptation layer, then forming the I/Q data frame into a GFP frame via Generic Framing Procedure (GFP) and transmitting it on SDH/OTN; and carrying the control signaling of the control plane on User Data Protocol (UDP)/Internet Protocol (IP) and/or Transmission Control Protocol (TCP)/Internet Protocol (IP), and further carrying IP packet on Point to Point Protocol (PPP) and forming it into a frame by High-Level Data Link Control (HDLC), transmitting the HDLC frame including the control plane signaling on the SDH/OTN via control character channel of the GFP frame;

further including the step of transmitting control plane signaling frame using the control character channel of a GFP-T client data frame, comprising:

at the transmitting end:

forming the I/Q sampling data into an I/Q data frame via the I/Q data frame adaptation layer;

processing the I/Q data frame by a transmission scheduling unit and then mapping it into a 64B/65B code block by a 64B/65B coding unit so as to form a GFP-T client data frame, wherein the 64B/65B code block includes a padding character and the control plane signaling frame character, as well as the data character of the I/Q data frame;

forming the formed GFP-T frame into VC (Virtual Container)/ODU (Optical Channel Data Unit) by a VC/ODU Mapping/concatenating unit, then further forming a STM-N/OTM-n frame; and at the receiving end:

separating the corresponding VC/ODU from the STM-N/OTM-n frame and extracting its payload;

obtaining the 64B/65B code blocks after being processed by a GFP-T frame processing unit, separating the I/Q data frame character stream and the control plane signaling frame character stream by a 64B/65B decoding unit, wherein the I/Q data frame character stream is further processed by an I/Q data frame processing unit to obtain the respective I/Q data streams of respective carrier frequencies from respective antennas.

2. The method for transmitting signal of claim 1, further configuring the communication interface between the RRU and the MU, so that the RRU-MU interface can support the transmission of a plurality of carrier frequency wireless signals, and support the transmission of multi-antenna signals corresponding to the same carrier frequency and ensure that the transmission time delays of respective antenna signals are the same during transmission in the wireless BTS system adopting multi-antenna technology.

3. The method for transmitting signal of claim 1, wherein the step of forming the I/Q data frame into a GFP frame via GFP at the interface between the RRU and the MU includes:

transmitting the wireless signals corresponding to M carrier frequencies of each RRU respectively by respective super blocks of the GFP-T frame via time division multiplexing the transmission bandwidth of the GFP-T, where $M \geq 1$.

4. The method for transmitting signal of claim 1, wherein the step of forming the I/Q sampling data concerning the user data carried by the user plane into an I/Q data frame via an I/Q data frame adaptation layer includes:

sequentially arranging the I/Q baseband signals of the mth carrier frequency from respective antennas at the same sampling time, where m=1, 2, ... M, wherein setting the sequence of the sampling values of the I/Q baseband signals from respective antennas to be the same with the spatial location sequence of antenna array or antenna group, and sequentially arranging the sampling values of the I/Q baseband signals from the same antenna according to quadrature component sampling values and In-phase component sampling values to form a single I/Q data frame.

5. The method for transmitting signal of claim 1, wherein the step of forming the I/Q sampling data concerning the user data carried by the user plane into an I/Q data frame via an I/Q data frame adaptation layer includes:

sequentially arranging the I/Q baseband signals of the mth carrier frequency from respective antennas at the same sampling time, where m=1, 2, ... M, wherein setting the sequence of the sampling values of the I/Q baseband signals from respective antennas to be the same with the spatial location sequence of antenna array or antenna group, and sequentially arranging the sampling values of the I/Q baseband signals from the same antenna according to quadrature component sampling values and In-phase component sampling values;

sequentially arranging M I/Q data with the same sampling timing from M carrier frequencies so as to form multiple data blocks; and sequentially arranging the multiple data blocks according to sampling time increment so as to form a single I/Q data frame.

6. The method for transmitting signal of claim 1, wherein the definition of the control character in the code block is:

the most significant bit b7 indicating whether the following bytes in the 64B/65B code block is the control character;

the following b6 indicating whether the control character is a padding character;

the following b5 indicating wireless frame synchronization;

the last one in the high 4 bits, b4 being reserved for extension; and the low 4 bits for transmitting the in-band control character stream.

7. The method for transmitting signal of claim 1, wherein GFP client management frame is used to inspect and maintain the GFP transmission link of the RRU-MU interface, the GFP client management frame complying with the GFP standard of ITU-T/ANSI.

8. The method for transmitting signal of claim 1, further including the step of synchronizing the wireless frames and measuring round trip transmission time delay (RTT) using a wireless frame synchronization indication bit, the step comprising:

making the wireless frame timing at MU side to be timing reference for all RRUs linked therewith;

in down stream, sending downstream I/Q data stream to the RRU via GFP-T, when wireless frame staffing time at MU side appears, if the padding character is transmitted now, the wireless frame synchronization indication bit of this character is set to "1", if the I/Q data frame character is transmitted now, insert a padding character at this time immediately and set the wireless frame synchronization indication bit of this character to "1"; the time that the RRU receives the control character with its wireless frame synchronization indication bit set to "1" will be the wireless frame starting time at RRU side, a certain delay between the wireless frame timing at RRU side and that at MU side being appeared because of transmission time delay;

in up stream, sending upstream I/Q data stream to the MU via GFP-T, once the RRU has received the wireless frame synchronization indication of downstream, if the padding character is transmitted now, the wireless frame synchronization indication bit of this character is set to "1", if the I/Q data frame character is transmitted now, insert a padding character at this time immediately and set the wireless frame synchronization indication bit of this character to "1"; a certain delay between the wireless frame synchronization indication received by the MU from the RRU and the wireless frame timing at RRU side being appeared because of transmission time delay;

obtaining the round trip transmission time delay (RTT) estimation by calculating the difference between the wireless frame starting time fed back by the RRU and the starting time of the original wireless frame timing in the MU.

9. The method for transmitting signal of claim 8, further including the step of adjusting RRU time delay to ensure the wireless frame timing synchronized among respective cells in CBTS, the step of adjusting RRU time delay comprising:

the MU sending the wireless frame timing to respective RRUs relatively earlier or later by using the obtained RRT measurements of respective RRUs, to make the wireless frame timing of respective RRUs to be the same, so as to continuously track the RRT variations of respective RRUs and keep the wireless frame timing synchronized among respective RRUs.

10. The method for transmitting signal of claim 1, further including:

the RRU obtaining frequency reference with high stability; and recovering or obtaining the bit synchronization clock of the I/Q data stream synchronous with that of the transmitting end when re-building I/Q data stream at the receiving end.

11. The method for transmitting signal of claim 10, further including:

both the MU and respective RRUs getting frequency reference with high stability from Global Positioning System (GPS), and using this frequency reference as the sampling clock source of the digital wireless signal data stream, so as to get digital wireless signal data stream bit timing and the frequency reference with high stability required by the RRU.

12. The method for transmitting signal of claim 10, further including: using the feature that the continuous data stream transmitted itself has constant bit rate to recover clock for the constant data stream through Phase Locked Loop.

13. The method for transmitting signal of claim 12, further including:

in down stream:

the MU using the reference clock source with high stability to provide timing for the GFP-T framing and VC/ODU mapping model at the transmitting end of the MU-RRU interface at MU side, the receiving end at RRU side recovering the digital wireless signal data stream clock using the PLL based on First In First Out (FIFO), at the same time the clock is also the reference frequency source of the RRU; and in up stream:

the GFP-T framing and VC/ODU mapping model at the transmitting end of the MU-RRU interface at RRU side sending data using the synchronization clock obtained in down stream, the receiving end at MU side providing timing for the GFP-T frame decoding and VC/ODU demapping model, using the above reference clock source in the MU;

the clock of the STM-N/OTM-n interface at the transmitting/receiving end being directly extracted from SDH/OTN line, instead of using the above client data clock.

* * * * *